United States Patent [19]

Nagata

[11] Patent Number: 5,230,215
[45] Date of Patent: Jul. 27, 1993

[54] OCEAN CURRENT POWER GENERATION SYSTEM

[76] Inventor: Tsugio Nagata, 16-6, Kohenjiminami 4-chome, Suginami-ku, Tokyo, Japan

[21] Appl. No.: 952,272

[22] Filed: Sep. 28, 1992

[30] Foreign Application Priority Data

Apr. 14, 1992 [JP] Japan ............................. 4-120141

[51] Int. Cl.$^5$ ............................................. F03C 5/00
[52] U.S. Cl. ........................................ 60/502; 290/54; 416/197 A
[58] Field of Search .............. 60/495, 502; 290/43, 290/54; 415/7, 8; 416/197 A

[56] References Cited

U.S. PATENT DOCUMENTS 4,748,808  6/1988  Hill ........................... 290/54 X

FOREIGN PATENT DOCUMENTS 0156467  12/1981  Japan ................................ 290/43

Primary Examiner—Stephen F. Husar
Attorney, Agent, or Firm—Wenderoth, Lind & Ponack

[57] ABSTRACT

An ocean current power generation system includes a support placed on or in a state spaced apart from the ocean surface so that it is not rotated by an ocean current, a ring-like rotating member horizontally suported by the support for rotation about an axis, a plurality of ocean current-receiving members coupled in a hanging fashion to the ring-like rotating member for receiving the ocean current and rotating the ring-like rotating member at all times in a fixed direction corresponding to a direction of the ocean current, a drive gear provided on the ring-like rotating member for rotating in a concentric relation to the ring-like rotating member, a rotation accelerating gear train provided inside the support for receiving the rotation of the drive gear to accelerate its rotation, and a power generator provided inside the support and connected to the rotation accelerating gear train for receiving the accelerated rotation of the rotation accelerating gear train.

13 Claims, 6 Drawing Sheets

OCEAN CURRENT POWER GENERATION SYSTEM

FIELD OF THE INVENTION

The present invention relates to an ocean current power generation system utilizing the kinetic energy of an ocean current.

DESCRIPTION OF THE PRIOR ART

Energy is required in almost all industrial fields. In recent years, however, there are limitations on the natural resources and also environmental problems on a global scale. Under these circumstances, stress has been laid on the necessity of developing polution-free substitute energy to replace nuclear energy and fossil energy. The researches and investigations made to date are in a fundamental state, and no specific ocean current power generation system has been proposed.

OBJECT AND SUMMARY OF THE INVENTION

An object of the present invention is to provide an ocean current generation system making efficient use of the kinetic energy of an ocean current.

To attain the object described above, according to the present invention there is provided an ocean current power generation system comprising a support placed on the ocean surface so that it is not rotated by an ocean current, a ring-like rotating member horizontally supported by the support for rotation about an axis, a plurality of ocean current receiving members coupled in a hanging fashion to the ring-like rotating member for receiving the ocean current and rotating the ring-like rotating member at all times in a fixed direction corresponding to a direction of the ocean current, a drive gear provided on the ring-like rotating member for rotating in a concentric relation to the ring-like rotating member, a rotation accelerating gear train provided inside the support for receiving the rotation of the drive gear to accelerate its rotation, and a power generator provided inside the support and connected to the rotation accelerating gear train for receiving the accelerated rotation of the rotation accelerating gear train.

The above and other objects, characteristic features and advantages of the present invention will become more apparent from the description to be given herein below with reference to the accompanying drawings.

DETAILED DESCRIPTION OF THE PREFERRED EMBODIMENTS

Now, the present invention will be described in detail with reference to the illustrated embodiments.

Figure 1:
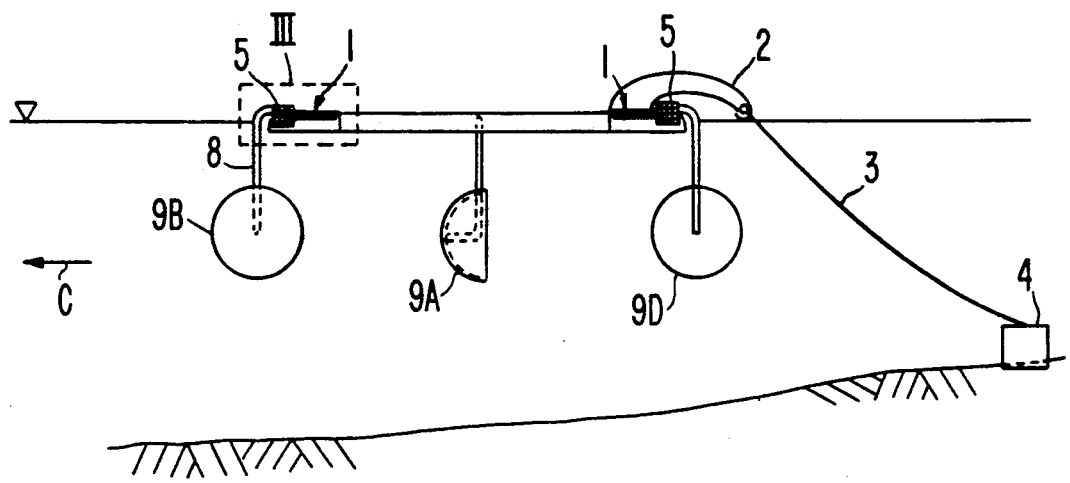
FIG. 1 is a partially sectioned side view showing one embodiment of the ocean current power generation system according to the present invention.
Figure 2:
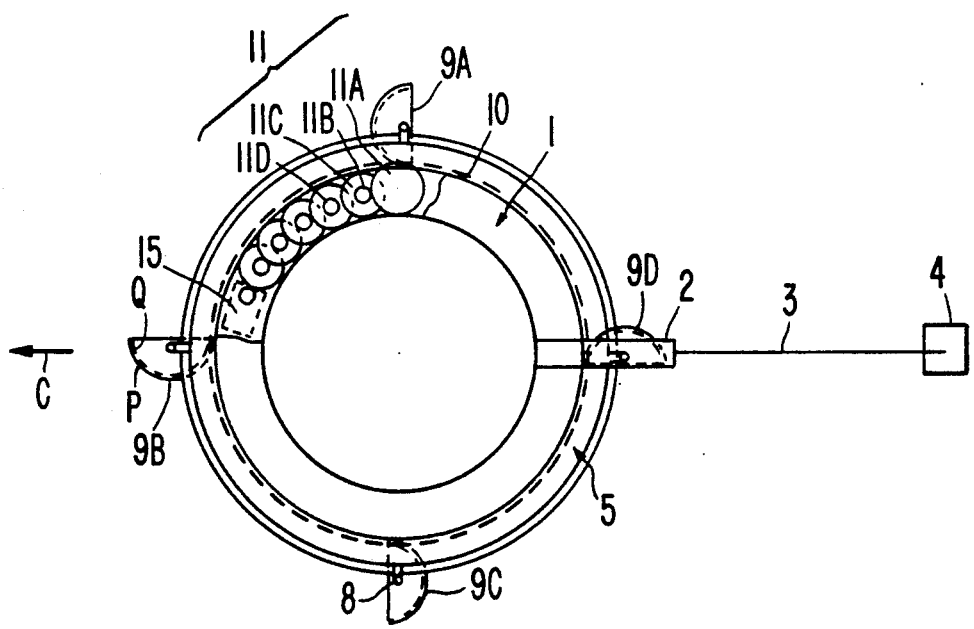
FIG. 2 is a partially cutaway plan view showing the embodiment of FIG. 1.
Figure 3:
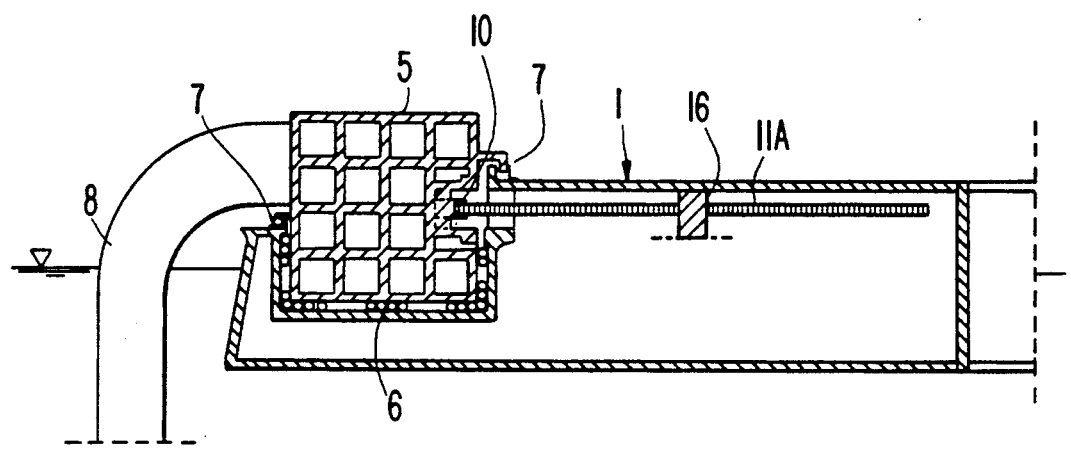
FIG. 3 is an enlarged sectional view showing a portion III in FIG. 1.

FIG. 1 to FIG. 3 show the first embodiment of the ocean current power generation system according to the present invention. In this embodiment, a large, horizontal, hollow and closed ring or support 1 has a buoyant structure to float on the ocean surface and is coupled by a mounting arm 2 and a mounting chain 3 to an anchor block 4 fixed on the bottom of the ocean. In this way, the support 1 is secured in position to prevent itself from being rotated and carried away by the ocean current. The support 1 has an annulargroove in which a ring-like rotating member 5 is received via rotating support members 6 such as rollers so that the rotating member 5 can be supported horizontally and rotated about its axis. Elastic members 7 are provided to prevent sea water from entering the space of the support 1 in which the rotating support members 6 are placed. To the rotating member 5 are coupled four ocean current-receiving members 9A, 9B, 9C and 9D by respective arms 8. The four members 9A to 9D are arranged at regular intervals of 90 degrees in a hanging state and serve to receive the ocean current and rotate the ring-like rotating member 5 fitted in the annular groove of the support 1 in a fixed direction corresponding to the direction of the ocean current. Each of the four members 9A to 9D has a convex curved surface P and a concave curved surface Q so that their concave curved surfaces Q are at right angles relative to the tangential direction of rotation of the ring-like rotating member 5 and are each directed to the convex curved surface P of the forwardly adjacent ocean current-receiving member. Both the arms 8 and the ocean-current receiving members 9A to 9D have a hollow structure with air sealed therein to provide buoyancy and make them light in weight. The size of the ring-like rotating member 5 is determined depending on the velocity and intensity of the ocean current and the material for the member 5 and in view of the structural mechanics. In the embodiment shown in FIG. 1 through FIG. 3, the ring-like rotating member 5 has a diameter of about 100 to 200 m.

The direction of the ocean current is indicated by arrow C in FIG. 1 or FIG. 2. The force of the ocean current acting on the concave curved surface Q of the ocean current-receiving member 9A on the upper side in FIG. 2 is greater than that acting on the convex curved surface P of the ocean current-receiving member 9C on the lower side in FIG. 2. However, the forces acting on the ocean current-receiving members 9B and 9D on the center line in FIG. 2 are nearly equal. Therefore, the ring-like rotating member 5 is allowed to rotate in the counter-clockwise direction in FIG. 2. Since this rotating action does not vary greatly even if the positions of the four members 9A to 9D should be changed, the ring-like rotating member 5 rotates in the fixed direction, i.e. in the counterclockwise direction, at all times.

The ring-like rotating member 5 is provided on the inner periphery thereof with an internal drive gear 10 which rotates integrally with the ring-like rotating member 5. The support 1 is provided therein with a rotation accelerating gear train 11 which receives the rotation of the internal drive gear 10 to accelerate its rotation. As illustrated in FIG. 3, the rotation accelerating gear train 11 includes a plurality of gears, the first gear 11A of which is rotatably supported on a shaft 16 and brought into engagement with the internal drive gear 10 of the ring-like rotating member 5. As shown in FIG. 2, the first gear 11A is in mesh with a second gear 11B which is rotatably supported coaxially with a third gear 11C which is in turn in mesh with a fourth gear 11D. With this arrangement, the gears of the rotation accelerating gear train 11 progressively increases their rotation, and the largest rotation of the final gear is given to a power generator 15. Although FIG. 2 only shows the accelerating gear train 11 and power generator 15 on the upper side, another rotation accelerating gear train of the same structure and another power generator of the same structure are actually provided inside the support 1 on the lower side in FIG. 2.

Thus, the support 1 forms an inside space large enough to accommodate the two rotation accerelating gear trains 11 and two power generators 15, has a structure strong enough to endure the load received from the ring-like rotating member 5 and the load directly exerted on the support 1, and is adapted to enjoy buoyance for allowing the support 1 as a whole to float on the ocean surface.

Figure 4:
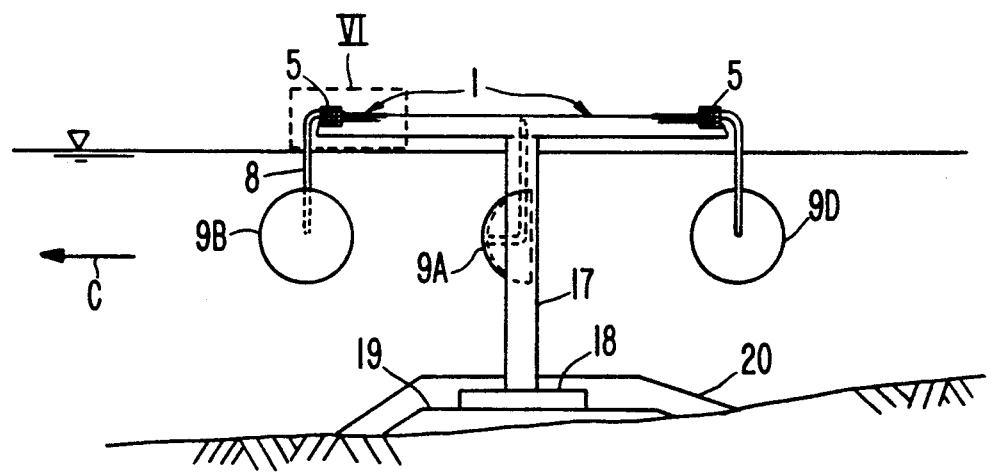
FIG. 4 is a partially sectioned side view showing another embodiment of the ocean current power generation system according to the present invention.
Figure 5:
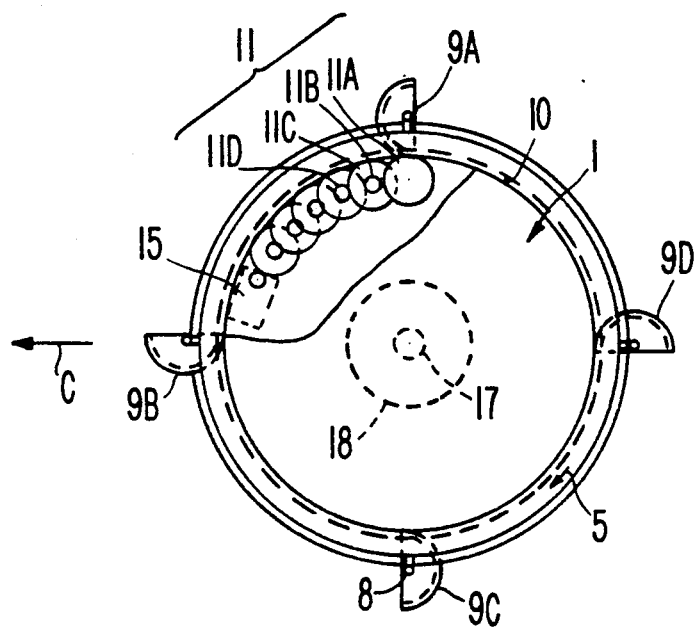
FIG. 5 is a partially cutaway plan view showing the embodiment of FIG. 4.
Figure 6:
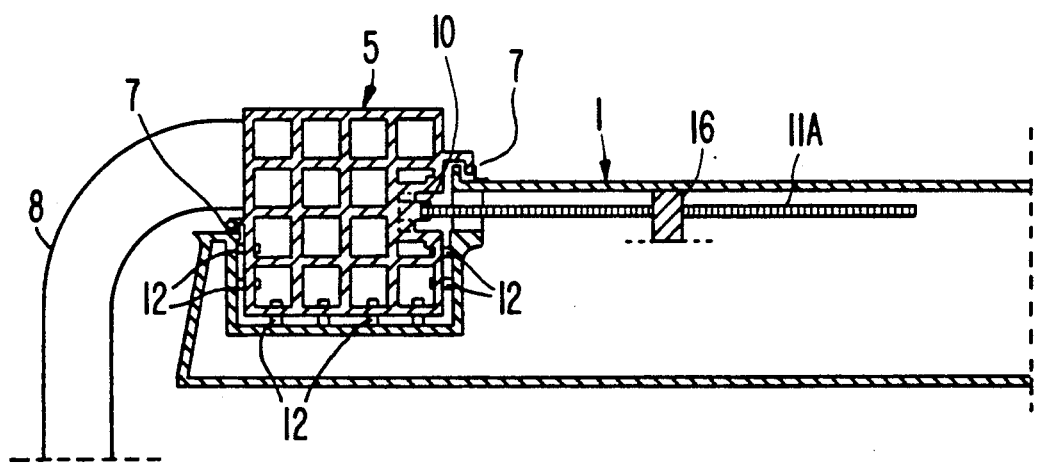
FIG. 6 is an enlarged sectional view showing a portion VI in FIG. 4.

FIG. 4 to FIG. 6 illustrate the second embodiment of the ocean current power generation system according to the present invention, wherein a support 1 is secured to and supported by a stationary shaft secured to the ocean bottom. This stationary structure is suitable for a shallow portion of the ocean because a foundation can be installed on the bottom of the shallow portion.

The support 1 is disklike and hollow and has its central portion secured to and supported by a support pillar 17. The foundation is formed by laying gravel 19, for instance, to level the ocean bottom. Then, the support 1 and support pillar 17 are brought together, with a hollow foundation 18 coupled to the lower end of the support pillar 17, to an intended position of installation. The system is then sunk using concrete as a weight. Then packaged concrete is sunk onto and in the vicinity of the foundation to protect the foundation. In this embodiment, the support 1 is positioned several meters above the ocean surface. A ring-like rotating member 5 is rotatably supported on the support 1 by support members 12 which are wheels as shown in FIG. 6, but may be rollers as in the first embodiment. The support members 12 constituted of wheels are provided not only on the bottom but also on the sides of the ring-like rotating member 5.

The remainder of the structure is the same as that in the first embodiment shown in FIG. 1 through FIG. 3. Reference numeral 7 designates a member for preventing the intrusion of sea water, numeral 8 arms, numeral 10 a internal drive gear, numeral 11 a rotation accelerating gear train comprising a plurality of gears including a first gear 11A, a second gear 11B, a third gear 11C and a fourth gear 11D, and numeral 15 a power generator. Further, 9A to 9D stand for ocean current-receiving members and arrow C indicates the direction of the ocean current.

Figure 7:
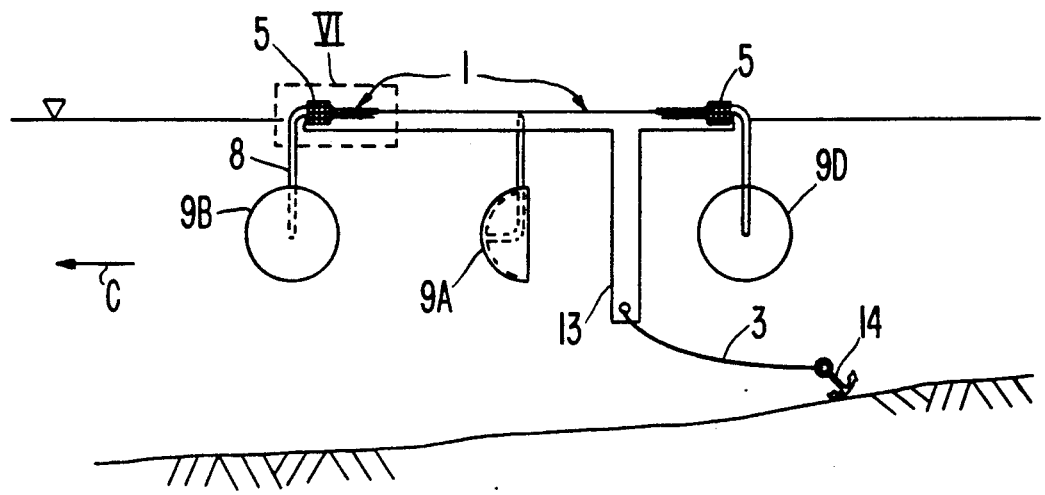
FIG. 7 is a partially sectioned side view showing still another embodiment of the ocean current power generation system according to the present invention.
Figure 8:
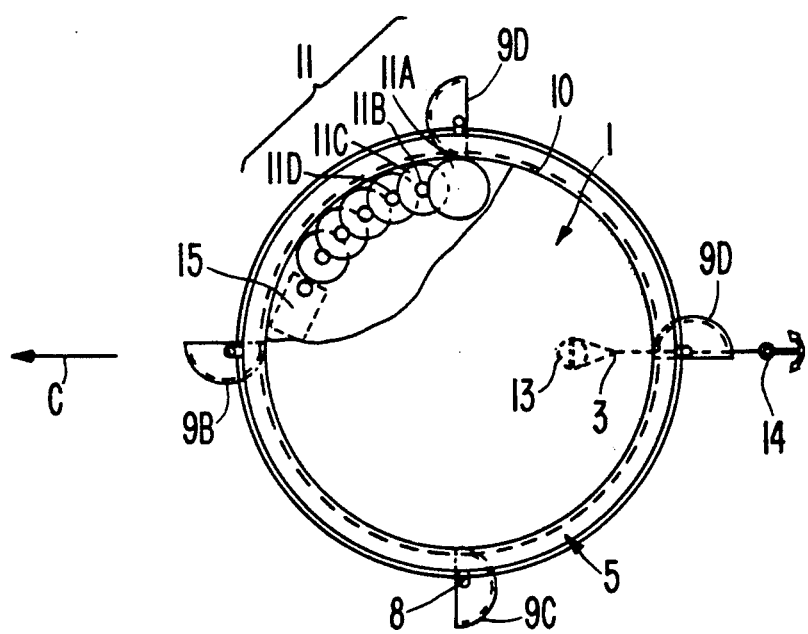
FIG. 8 is a partially cutaway plan view showing the embodiment of FIG. 7.

FIG. 7 and FIG. 8 illustrate the third embodiment of the ocean current power generation system according to the present invention, which is similar to the second embodiment shown in FIG. 4 through FIG. 6, but is suitable for a deep portion of the ocean, on the bottom of which it is difficult to install a foundation. The details of a portion VI in FIG. 7 are the same as those of the portion VI in FIG. 4 and are shown in FIG. 6.

In this instance, a disklike support 1 floats on the ocean surface and has a depending mounting member 13 which is provided at a position of the support 1 on the upstream side of the center in order to prevent the rotation of the support 1. To the free end of the mounting member 13 one end of a mounting chain 3 is attached. To the other end of the mounting chain 3 an anchor 14 is coupled. The anchor 14 is sunk onto the ocean bottom to secure the system in position. In this case, the length of the mounting chain 3 is not excessively close to sea current-receiving members 9A to 9D.

The remainder of the structure is the same as in the first embodiment shown in FIG. 1 through FIG. 3. Reference numeral 5 designates a ring-like rotating member, numeral 8 arms, numeral 10 an internal drive gear, numeral 11 a rotation accelerating gear train comprising a plurality of gears including a first gear 11A, a second gear 11B, a third gear 11C and a fourth gear 11D, and numeral 15 a power generator. Arrow C indicates the direction of the ocean current.

FIG. 9 through FIG. 13 illustrate the fourth embodiment of the ocean current power generation system according to the present invention, which has a buoyant structure having a support 1 floating on the ocean surface. The support 1 is a large horizontal ring-like member double-walled, open on the outer periphery and oval in the sectional profile. A ring-like rotating member 5 having an oral sectional profile is rotatably supported via rotating support members 6 constituted of rollers in the support 1. To the ring-like rotating member 5 are coupled a plurality of ocean current-receiving members 9A to 9D via respective arms 8. On the inner side of the support 1 is provided a ring-like buoyant member 22 which accommodates therein rotation accelerating gear trains 11, power generators 15 and so on. The buoyant member 22 is coupled at several positions via hinge means 23 comprising hinges 23A to 23D to the support 1. In this embodiment, the ring-like rotating member 5 desirably has a diameter of about 500 to 800 m.

Figure 11:
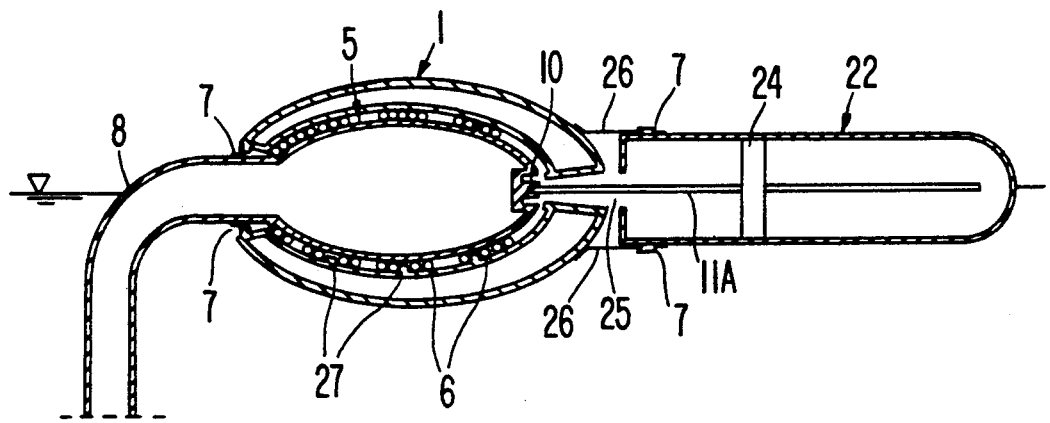
FIG. 11 is an enlarged sectional view taken along line XI—XI in FIG. 10.
Figure 12:
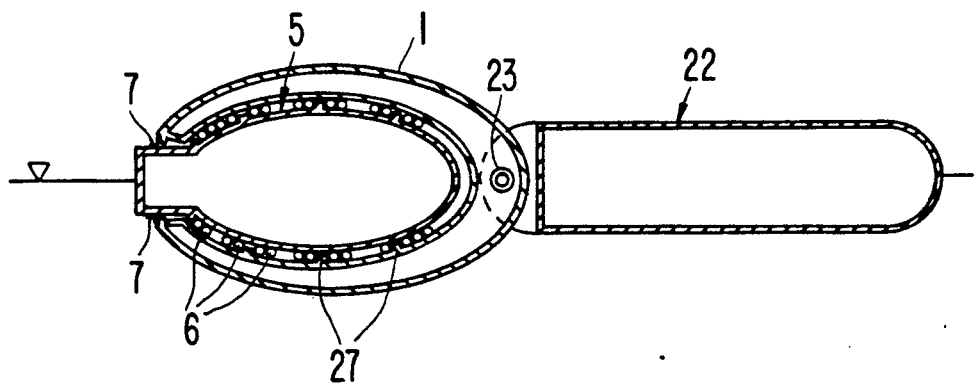
FIG. 12 is an enlarged sectional view taken along line XII—XII in FIG. 10.
Figure 13:
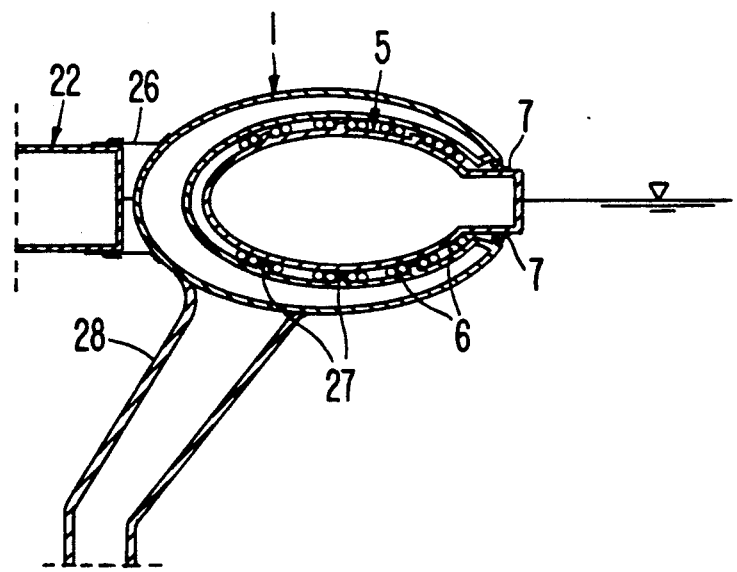
FIG. 13 is an enlarged sectional view taken along line XIII—XIII in FIG. 10.

An internal drive gear 10 is provided on the inner periphery of the ring-like rotating member 5. A rotation accelerating gear train 11 is provided inside the buoyant member 22. In order to cause a first gear 11A of the gear train 11 to be in mesh with the internal drive gear 10, as shown in FIG. 11 a slot 25 is formed through the buoyant member 22, support 1 and ring-like rotating member 5 at a position free from the hinge means 23. The first gear 11A passes through the slot 25 and meshes with the internal drive gear 10 provided inside the ring-like rotating member 5. The neighborhood of the portions in which the hinge means 23 and slot 25 are provided is reinforced in structure to cope with generation of excessive local stress. The portions of the slot 25 in the support 1 and buoyant member 22 are covered with an elastic cover member 26 to prevent sea water from entering. The cover member 26 and support 1 have their respective end portions provided with an elastic sea water intrusion-preventing member 7.

In this embodiment, the ring-like rotating member 5 has an oval sectional profile in order to prevent the arms 8 from moving vertically in FIG. 11. The space accommodating the support members 6 constituted of rollers is provided with partition walls 27 at several positions in the direction of movement of the support members 6 to prevent the support members 6 from being unevenly located on the opposite sides.

Figure 9:
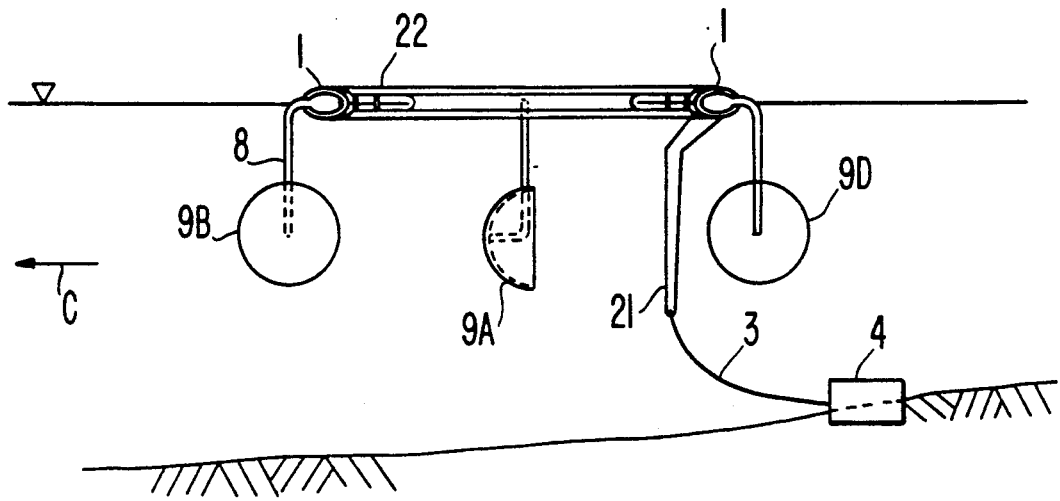
FIG. 9 is yet another embodiment of the ocean current power generation system according to the present invention.
Figure 10:
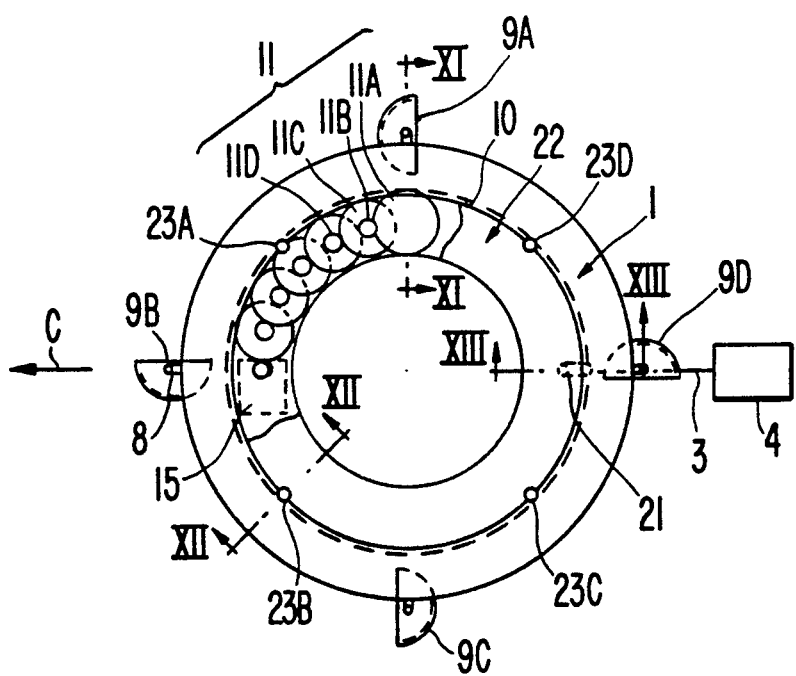
FIG. 10 is a partially cutaway plan view showing the embodiment of FIG. 9.

As shown in FIG. 9, a mounting arm 21 extends from the support 1. An anchor block 4 is coupled by a mounting chain 3 to the mounting arm 21. It is possible to mount the mounting arm 21 on the buoyant member 22.

The remainder of the structure is the same as in the first embodiment shown in FIG. 1 through FIG. 3. Denoted by reference numeral 24 is a shaft on which the first gear 11A of the gear train 11 is rotatably supported. The second, third and fourth gears of the gear train 11 are denoted by 11B, 11C and 11D, respectively. Arrow C indicates the direction of the ocean water.

As an example, the flow rate of the Kuroshio current (the Japan current) is said to be 800 times that of the Amazon river. The flow rate of the Gulf Stream is supposed to be larger. The quantity of kinetic energy of the ocean current is enormous. The present invention can provide a novel method for the ocean current power generation and, depending on the status of ocean areas, the tidal flowing can be utilized in this method. In the ocean current power generation system according to this invention, it is possible to obtain power large enough to be put into practical use. Further, since the vast ocean surface constitutes spots of resources, the present invention can serve as powerful means for solving energy problems.

What is claimed is:

1. An ocean current power generation system comprising:
    a support placed on the ocean surface so that it is not rotated by an ocean current;
    a ring-like rotating member horizontally supported by said support for rotation about an axis;
    a plurality of ocean current-receiving members coupled in a hanging fashion to said ring-like rotating member for receiving the ocean current and rotating said ring-like rotating member at all times in a fixed direction corresponding to a direction of the ocean current;
    a drive gear provided on said ring-like rotating member for rotating in a concentric relation to said ring-like rotating member;
    a rotation accelerating gear train provided inside said support for receiving the rotation of said drive gear to accelerate its rotation; and
    a power generator provided inside said support and connected to said rotation accelerating gear train for receiving the accelerated rotation of said rotation accelerating gear train.

2. An ocean current power generation system according to claim 1, wherein said support has a buoyant structure to float on the ocean surface and is coupled to a stationary object fixed on the bottom of the ocean.

3. An ocean current power generation system according to claim 1, wherein said support has a stationary structure secured to and supported by a support pillar secured to the bottom of the ocean.

4. An ocean current power generation system according to claim 1, wherein said support has an annular groove in which said ring-like rotating member is horizontally supported for rotation about the axis.

5. An ocean current power generation system according to claim 1, wherein said support is a horizontal hollow ring open on the outer periphery and having a circular or oval sectional profile.

6. An ocean current power generation system according to claim 1, wherein said plurality of ocean current-receiving members each have a convex curved surface and a concave curved surface so that the concave curved surface is at right angles relative to a tangential direction of rotation of said ring-like rotating member and is directed to the convex curved surface of a forwardly adjacent ocean current-receiving member.

7. An ocean current power generation system according to claim 1, wherein said drive gear is an internal gear which rotates integrally with said ring-like rotating member.

8. An ocean current power generation system comprising:
    a support having an axis and placed in a state spaced apart from the ocean surface so that it is not rotated by an ocean current;
    a ring-like rotating member horizontally supported by said support for rotation about the axis of said support;
    a plurality of ocean current-receiving members coupled in a hanging fashion to said ring-like rotating member for receiving the ocean current and rotating said ring-like rotating member at all times in a fixed direction corresponding to a direction of the ocean current;
    a drive gear provided on said ring-like rotating member for rotating integrally with said ring-like rotating member;
    a rotation accelerating gear train provided inside said support for receiving the rotation of said drive gear to accelerate its rotation; and
    a power generator provided inside said support and connected to said rotation accelerating gear train for receiving the accelerated rotation of said rotation accelerating gear train.

9. An ocean current power generation system according to claim 8, wherein said support has a stationary structure secured to and supported by a support pillar secured to the bottom of the ocean.

10. An ocean current power generation system according to claim 8, wherein said support has an annular groove in which said ring-like rotating member is horizontally supported for rotation about the axis.

11. An ocean current power generation system according to claim 8, wherein said support is a horizontal hollow ring open on the outer periphery and having a circular or oval sectional profile.

12. An ocean current power generation system according to claim 8, wherein said plurality of ocean current-receiving members each have a convex curved surface and a concave curved surface so that the concave curved surface is at right angles relative to a tangential direction of rotation of said ring-like rotating member and is directed to the convex curved surface of a forwardly adjacent ocean current-receiving member.

13. An ocean current power generation system according to claim 8, wherein said drive gear is an internal gear rotated about the axis of rotation of said ring-like rotating member.

* * * * *